(12) United States Patent
Stellbrink et al.

(10) Patent No.: US 7,567,370 B2
(45) Date of Patent: Jul. 28, 2009

(54) COLOR DISPLAY HAVING LAYER DEPENDENT SPATIAL RESOLUTION AND RELATED METHOD

(75) Inventors: Joseph Stellbrink, Lebanon, OR (US); Peter Fricke, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 138 days.

(21) Appl. No.: 11/881,215

(22) Filed: Jul. 26, 2007

(65) Prior Publication Data

US 2009/0027755 A1    Jan. 29, 2009

(51) Int. Cl.
    *G02F 1/03*      (2006.01)
    *G09G 5/02*      (2006.01)
(52) U.S. Cl. .................. 359/259; 345/591; 345/694; 345/698; 345/690; 345/76; 313/506
(58) Field of Classification Search .......... 359/259, 359/578, 584, 586, 589, 722, 723, 726; 345/7, 345/72, 59, 76, 83, 88, 89, 106, 107, 204, 345/589, 591, 690, 694–696; 349/61, 73, 349/74, 113, 114, 175; 313/500, 503–506, 313/582, 584, 586
See application file for complete search history.

(56) References Cited

U.S. PATENT DOCUMENTS

| | | | | |
|---|---|---|---|---|
| 3,256,776 A | * | 6/1966 | Daw et al. | 359/464 |
| 3,320,417 A | * | 5/1967 | Alburger | 250/487.1 |
| 3,507,549 A | * | 4/1970 | Land | 359/465 |
| 5,445,899 A | * | 8/1995 | Budzilek et al. | 428/690 |
| 5,870,072 A | * | 2/1999 | Tuli | 345/106 |
| RE36,654 E | | 4/2000 | Conner et al. | |
| 6,903,754 B2 | | 6/2005 | Brown Elliott | |
| 6,917,159 B2 | * | 7/2005 | Tyan et al. | 313/506 |
| 6,950,115 B2 | | 9/2005 | Brown Elliott | |
| 7,027,118 B1 | | 4/2006 | Wu et al. | |
| 7,123,277 B2 | | 10/2006 | Brown Elliott et al. | |
| 7,142,179 B2 | * | 11/2006 | Miller et al. | 345/76 |
| 7,209,105 B2 | | 4/2007 | Elliott | |
| 7,250,722 B2 | * | 7/2007 | Cok et al. | 313/506 |
| 2002/0015110 A1 | | 2/2002 | Brown Elliott | |
| 2003/0034992 A1 | | 2/2003 | Brown Elliott et al. | |
| 2003/0085906 A1 | | 5/2003 | Elliott et al. | |
| 2004/0021804 A1 | | 2/2004 | Hong et al. | |
| 2004/0046714 A1 | | 3/2004 | Brown Elliott | |
| 2004/0085495 A1 | | 5/2004 | Roh et al. | |
| 2004/0095521 A1 | | 5/2004 | Song et al. | |
| 2004/0169807 A1 | | 9/2004 | Rho et al. | |
| 2004/0196297 A1 | | 10/2004 | Elliott et al. | |
| 2004/0196302 A1 | | 10/2004 | Im et al. | |
| 2004/0239837 A1 | | 12/2004 | Hong et al. | |
| 2004/0246280 A1 | | 12/2004 | Credelle et al. | |
| 2004/0246381 A1 | | 12/2004 | Credelle | |

(Continued)

*Primary Examiner*—Loha Ben

(57) ABSTRACT

A color display including: a stacked plurality of color layers, each layer being selectively reflective or absorptive of light in a different portion of the human visible spectrum; wherein, the layers are each configured as a plurality of independently addressable picture elements, at least some of the picture elements in at least one of the layers are superimposed in the stack over at least some picture elements in at least one other of the layers, and a resolution of the superimposed picture elements in the at least one of the layers is different from the resolution of the superimposed picture elements in the at least one other of the layers.

16 Claims, 6 Drawing Sheets

U.S. PATENT DOCUMENTS

| | | |
|---|---|---|
| 2004/0246393 A1 | 12/2004 | Elliott et al. |
| 2004/0246404 A1 | 12/2004 | Elliott et al. |
| 2005/0068477 A1 | 3/2005 | Shin et al. |
| 2005/0083277 A1 | 4/2005 | Credelle |
| 2005/0083341 A1 | 4/2005 | Higgins et al. |
| 2005/0083344 A1 | 4/2005 | Higgins |
| 2005/0083345 A1 | 4/2005 | Higgins |
| 2005/0083352 A1 | 4/2005 | Higgins |
| 2005/0088385 A1 | 4/2005 | Elliott et al. |
| 2005/0099540 A1 | 5/2005 | Elliott et al. |
| 2005/0104908 A1 | 5/2005 | Brown Elliott |
| 2005/0134600 A1 | 6/2005 | Credelle et al. |
| 2005/0162600 A1 | 7/2005 | Rho et al. |
| 2005/0174363 A1 | 8/2005 | Brown Elliott |
| 2005/0212741 A1 | 9/2005 | Schlegel |
| 2005/0225548 A1 | 10/2005 | Han et al. |
| 2005/0225561 A1 | 10/2005 | Higgins et al. |
| 2005/0225562 A1 | 10/2005 | Higgins et al. |
| 2005/0225563 A1 | 10/2005 | Brown Elliott et al. |
| 2005/0225574 A1 | 10/2005 | Brown Elliott et al. |
| 2005/0225575 A1 | 10/2005 | Brown Elliott et al. |
| 2005/0248262 A1 | 11/2005 | Brown Elliott |
| 2005/0264580 A1 | 12/2005 | Higgins |
| 2005/0264588 A1 | 12/2005 | Brown Elliott |
| 2005/0275610 A1 | 12/2005 | Roh et al. |
| 2005/0276502 A1 | 12/2005 | Brown Elliott et al. |
| 2006/0061605 A1 | 3/2006 | Credelle |
| 2006/0145978 A1 | 7/2006 | Takatori et al. |
| 2006/0208981 A1 | 9/2006 | Rho et al. |
| 2006/0238649 A1 | 10/2006 | Brown Elliott et al. |
| 2006/0244686 A1 | 11/2006 | Higgins et al. |
| 2006/0284872 A1 | 12/2006 | Brown Elliott |
| 2007/0040952 A1 | 2/2007 | Roh et al. |
| 2007/0052721 A1 | 3/2007 | Im et al. |
| 2007/0052887 A1 | 3/2007 | Brown Elliot et al. |
| 2007/0057963 A1 | 3/2007 | Brown Elliott et al. |
| 2007/0064020 A1 | 3/2007 | Credelle et al. |
| 2007/0070086 A1 | 3/2007 | Brown Elliott et al. |
| 2007/0071352 A1 | 3/2007 | Brown Elliott et al. |
| 2007/0091043 A1 | 4/2007 | Rho et al. |
| 2007/0109330 A1 | 5/2007 | Brown Elliott et al. |
| 2007/0109331 A1 | 5/2007 | Brown Elliott et al. |

* cited by examiner

"prior art"

US 7,567,370 B2

COLOR DISPLAY HAVING LAYER DEPENDENT SPATIAL RESOLUTION AND RELATED METHOD

BACKGROUND OF THE INVENTION

Electronic, color, reflective displays are desirable. Such displays may have a broad range of applications, including electronic paper type applications, for example. It is believed that to achieve high color image quality with such a display, each primary color should be addressable at every image location, for example, at each picture element or pixel.

To fill this need, reflective display technologies typically utilize multiple, stacked color layers. Non-limiting examples of such technologies include: Guest-Host Liquid Crystal Displays (GH-LCDs), stacked cell electrophoretic displays and Cholesteric Liquid Crystal Displays (CLCDs).

GH-LCDs are discussed in "Color Design and Adjustment of Dichroic Dyes for Reflective Three-Layered Guest-Host Liquid Crystal Displays". *Mol. Cryst. Liq. Cryst.*, Vol. 443, pp. 105-116, 2005. As this article explains, GH-LCDs are believed to be suitable for portable information systems because of their low power consumption, relatively wide viewing angle and high reflectance. Three-layered GH-LCDs with subtractive color mixing of yellow, magenta and cyan have been presented as one technology expected to lead to the development of "full-color" reflective displays.

Referring now to FIG. 1, there is shown a schematic representation of a three-layer GH-LCD 10. GH-LCD 10 utilizes dichroic dyes that are dissolved in negative GH-liquid crystals in vertically stacked cells 2, 4, 6. In the illustrated embodiment, cell 2 may contain magenta dye crystals, cell 4 may contain cyan dye crystals and cell 6 may contain yellow dye crystals. Each of the cells is bounded by glass substrates 20 that support electrodes 30, 40. In the illustrated embodiment, electrodes 30 are transparent and may be composed of indium-tin-oxide (ITO). In the illustrated embodiment, electrode 40 is reflective, and may take the form of a metal electrode.

When a voltage is applied to the cell via the electrodes, the helical structure (on state) is realized and the dichroic dyes absorb a large quantity of light. In the off state, the liquid crystals are aligned vertically to the substrate, such that the dichroic dyes absorb only a small quantity of light. Each cell may be controlled independently to realize color imagery.

Stacked cell electrophoretic displays are discussed in U.S. Pat. No. 6,727,873, entitled "REFLECTIVE ELECTROPHORETIC DISPLAY WITH STACKED COLOR CELLS". Referring now to FIG. 2, there is shown a schematic representation of an electrophoretic display 50. Display 50 includes three stacked cells 52, 54, 56. Each cell 52, 54, 56 is bounded by windows 60. In the illustrated embodiment, windows 60 are light transmissive, and may be composed of glass. A reflective layer 70, such as a metal coating, is supported by the lower-most window 60. Cells 52, 54, 56 are also bounded by side-electrodes 80. Each cell 52, 54, 56 includes a post-electrode 90 and a colorless suspension fluid containing suspended pigment particles. In the illustrated embodiment, the particles suspended in cell 52 may be yellow, the particles suspended in cell 54 may be cyan and the particles suspended in cell 56 may be magenta in color.

Cells 52, 54, 56 may be switched between collected and dispersed states by appropriately charging the electrodes. In the collected state, the suspended particles approach the side-electrodes 80. In the dispersed state, the suspended particles are dispersed over substantially the entire horizontal area of the cell. Light entering a cell in the collected state passes there-through without substantial visual change. Light entering a cell in the dispersed state interacts with the suspended particles, and thereby undergoes a substantial visual change. Different combinations of collected and dispersed states of stacked cells may be used to provide different colored pixels.

Cholesteric Displays are discussed in U.S. Pat. No. 7,061,559, entitled "STACKED COLOR LIQUID CRYSTAL DISPLAY DEVICE". Referring now to FIG. 3, there is shown a schematic view of a cholesteric display 100. Display 100 includes four stacked cells 102, 104, 106, 108. Cells 102, 104 and 106 reflect light on the visible spectrum, while cell 108 reflects light in the infrared spectrum. Cell 102 contains chiral nematic liquid crystals having a pitch length that reflects red light. Cell 104 contains chiral nematic liquid crystals having a pitch length that reflects blue light. Cell 106 contains chiral nematic liquid crystals having a pitch length that reflects green light. Liquid crystals in cell 108 reflect infrared light.

Display 100 also includes five substrates 110, 112, 114, 116 and 118, the back (or bottom as shown) of which may be painted a color, or alternatively, a separate color imparting layer/substrate 120 may be used. Each substrate may support one or more ITO electrode, passivation and/or alignment layers. Applying an appropriate voltage to the electrodes allows the textures of the liquid crystals, and their reflectivity to be controlled.

Regardless of the particulars of the configuration used, for a pixelated device having three (CMY absorbing or RGB reflecting) or four (CMYK) monochrome display layers stacked on top of each other, the same number of pixels are typically addressed at each layer. This leads to a complex and costly display due to the multiplicity of associated driving circuitry and pixel structures.

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to like parts, and.

DETAILED DESCRIPTION OF THE PREFERRED EMBODIMENTS

The following description of embodiments of the invention is merely by way of example and is in no way intended to limit the invention, its application, or uses.

According to embodiments of the present invention, human visual system sensitivities may be leveraged such that the spatial resolution of each color layer can be independently tailored. In certain embodiments, the resulting total number of addressable pixels can be reduced by 25-65% as compared to a conventional multilayer color display, significantly reducing associated electronics costs.

Figure 1:
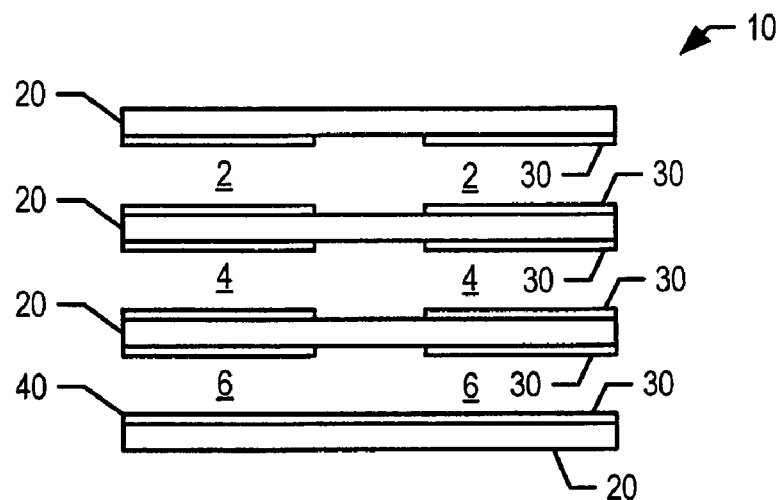
FIG. 1 illustrates a schematic view of a guest-host liquid crystal display.
Figure 2:
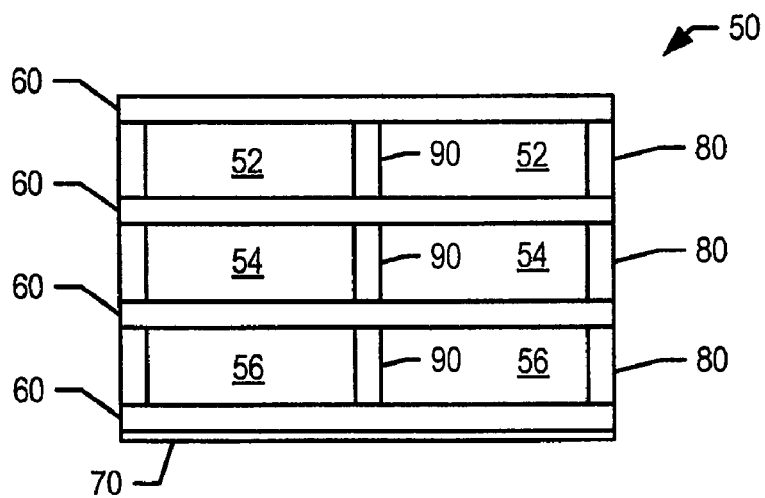
FIG. 2 illustrates a schematic view of an electrophoretic display.
Figure 3:
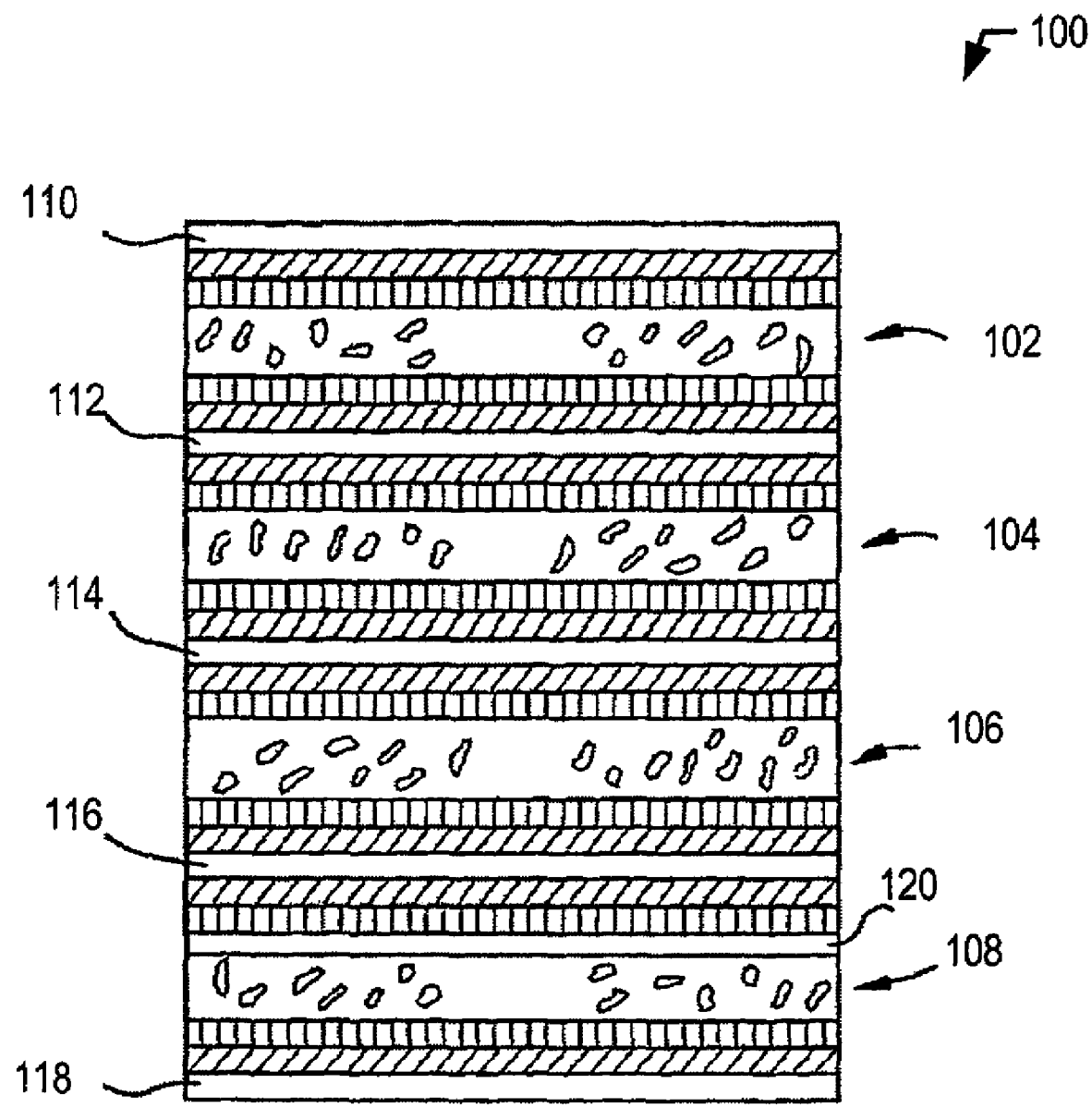
FIG. 3 illustrates a schematic view of a cholesteric display.
Figure 4:
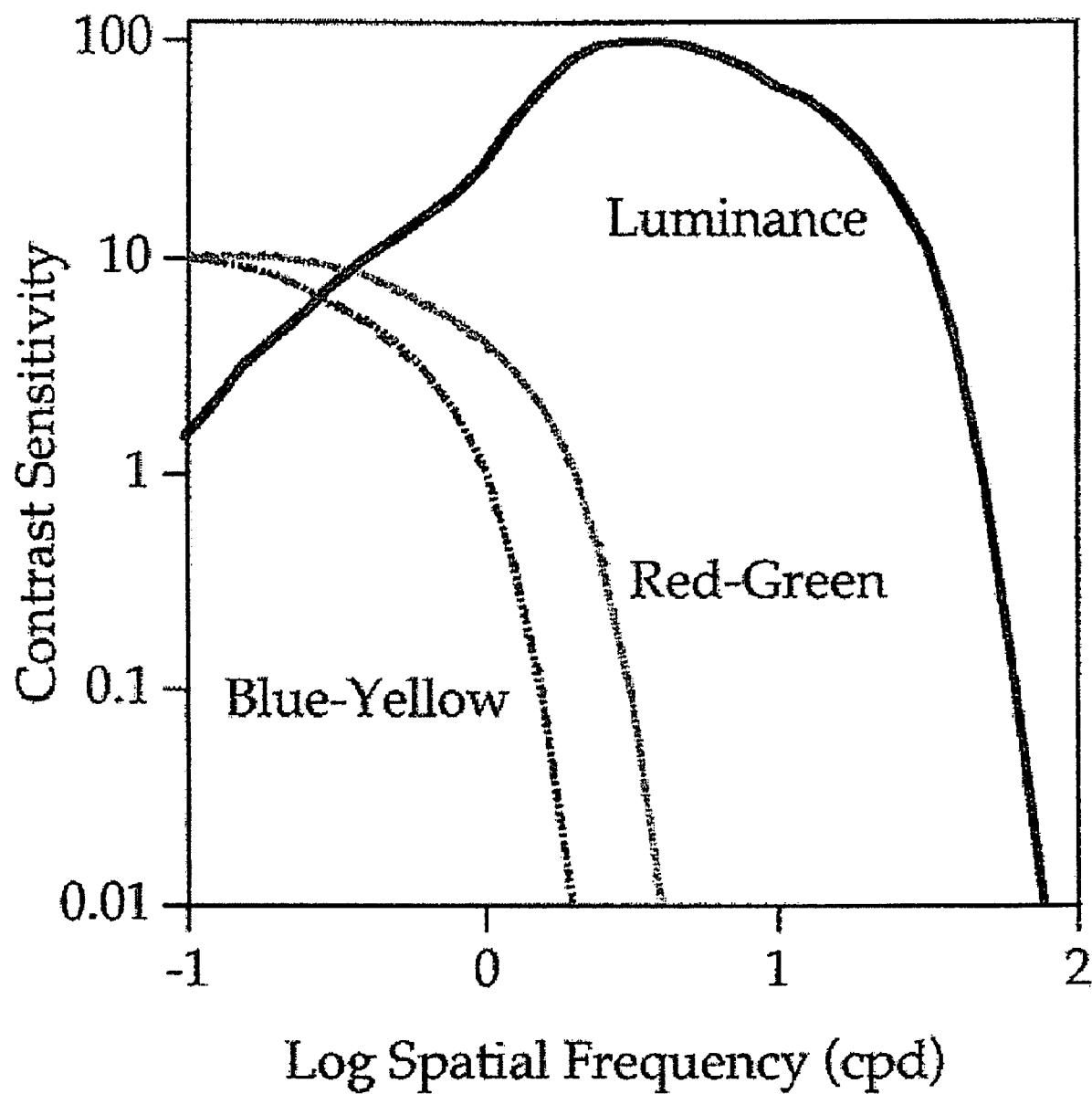
FIG. 4 illustrates a chart indicating human visual system contrast sensitivity versus spatial frequency, which is directly related to pixel size.

Referring now to FIG. 4, there is shown a chart indicating human visual system contrast sensitivity versus spatial frequency, which is directly related to pixel size. As shown in the graph, the human visual system is more spatially sensitive to the luminance contribution of stimuli than the chromatic contribution. As a result, the spatial resolution of each color layer can be matched to the corresponding luminance contribution, or more precisely the lightness contribution, which is the perceptually uniform attribute typically used for reflective technologies. For example, a layer which contributes mostly chromatic information, and little luminance modulation can have much lower spatial resolution, i.e., larger pixels, than a layer which contributes only luminance information, because the human visual system will have much lower sensitivity to the spatial resolution of that layer.

Figure 5:
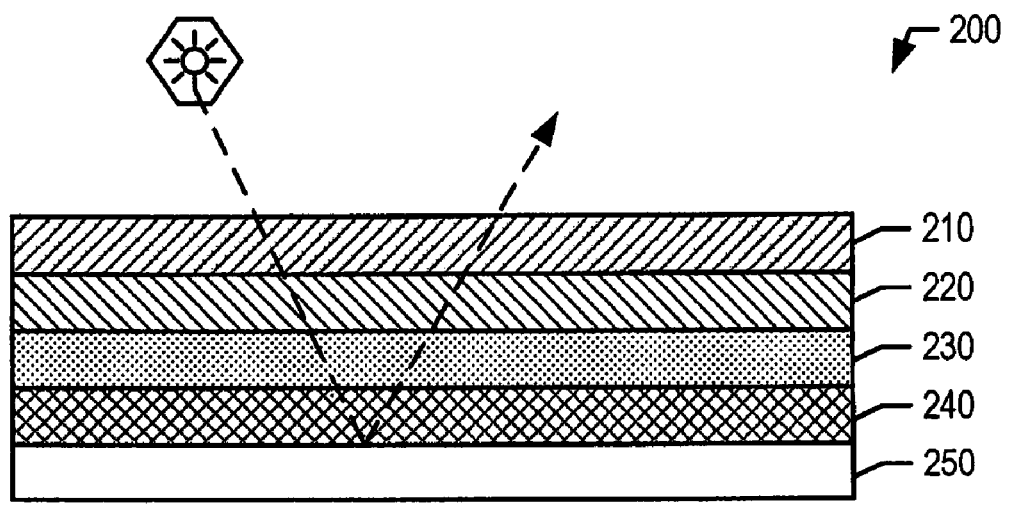
FIG. 5 illustrates a stacked, multi-layer color display according to an embodiment of the present invention.

Referring now also to FIG. 5, there is shown a schematic view of a stacked, multi-layer reflective color display 200 according to an embodiment of the present invention. Display 200 may take the form of a Guest-Host Liquid Crystal Display (GH-LCD), stacked cell electrophoretic display or cholesteric display for example. Of course, display 200 may take the form of another type of stacked, multi-layer color display. Regardless, the illustrated display 200 includes superimposed first, second, third and fourth modulate-able layers 210, 220, 230 and 240, backed by a final layer 250, which is either a reflector or absorber. If the stacked layers use an absorbing technology (e.g., GH-LCD or electrophoretic), a reflector is used to return all unabsorbed light to the display observer. If a selectively reflective technology is used (e.g., cholesteric) an absorbing layer is used to capture all light not reflected by the modulating layers. In certain embodiments, layer 210 may be modulated to control blue absorption (i.e., yellow colorant) or reflection, layer 220 may be modulated to control red absorption (i.e., cyan colorant) or reflection, layer 230 may be modulated to control green absorption (i.e., magenta colorant) or reflection and layer 240 may be modulated to control black absorption, such that display 200 is a CMYK-type display. While embodiments of the present invention will be discussed as they relate to a CMYK-type display having four layers, for non-limiting purposes of explanation, they may be applicable to other types of display with 3 or more layers, each used to modulate a different portion of the visible spectrum.

According to embodiments of the present invention each different color layer may be configured as, or organized into, a plurality of independently addressable picture elements, or pixels. According to embodiments of the present invention, different color layers may have different spatial resolutions. By way of further explanation, if a 100 pixel per inch (ppi) display 200 is desired, a black layer may modulate nearly 100% of the display's potential luminance range, such that layer 240 may utilize a full 100 ppi addressability. A yellow colorant layer, however, may only provide 10% of the lightness modulation relative to black, providing mostly chromatic information and contributing little to the perceived spatial resolution of the display. Thus, a lower spatial resolution (ppi) can be used for pixels in yellow layer 210. The lightness modulation of cyan and magenta lie somewhere between, such that the spatial resolution of layers 220, 230 may similarly lie between those of black layer 240 and yellow layer 210. Thus, according to an embodiment of the present invention, at least two layers in a stacked, multi-layer reflective color display may have different spatial resolutions. The spatial resolution of a particular layer may be related to the luminance contribution of that particular layer.

In certain embodiments of the present invention, a maximum grey component replacement approach may be used to increase the presentation of achromatic image information (~C=M=Y) in the black plane (K), thus improving performance where the black plane has the highest resolution. Grey component replacement techniques are known. Basically, achromatic values that sum to grey along the tone scale are replaced or supplemented with black values. Gray component replacement adds black in place of the CMY equivalent of what would have been presented as a grey.

Resulting reduced resolutions for the achromatic CMY layers allow the number of total addressable pixels to be reduced in certain embodiments by roughly 25-65% as compared to a display having a same number of addressable pixels in each color layer, depending upon the application. Displays adapted to present predominantly lower frequency image content (e.g., photographic images) may utilize addressable pixel reductions of greater than 50%, since the black layer can provide most of any high-frequency information required, while the color layers can be reduced in spatial resolution as they provide mostly lower-frequency chromatic information. Displays adapted to present images with significant high frequency color content, such as color text and color graphics with high-contrast edges, may utilize a higher spatial resolution from the cyan and magenta layers, thus reducing the potential pixel reduction benefit to approximately 25%. Nonetheless, instead of addressing 4× the number of pixels in a 4-layer device versus a comparable monochrome display, the number of independently addressable pixels can be reduced to 2-3×, which is similar to the case for conventional RGB displays that drive 3 sub-pixels within each fully addressable pixel.

Figure 6:
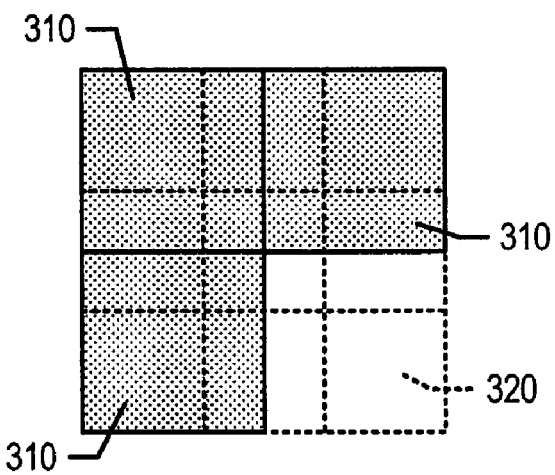
FIGS. 6-8 illustrate pixel configurations according to embodiments of the present invention.

One practical issue that may arise from using different pixel sizes (spatial resolutions), is that non-transmissive pixel areas, such as driver circuitry, may overlie the body of pixels positioned in other layers. Another potential concern is the creation of moire artifacts where the inactive area overlap occurs periodically over the display. Such a configuration is shown in FIG. 6, where the edges of yellow pixels 310 lie in the body of black pixels 320. In certain embodiments, these areas may be small, and relatively un-observable. For more significant inactive areas, the resulting loss of light and/or appearance of periodic artifacts may be considered undesirable.

Figure 7:
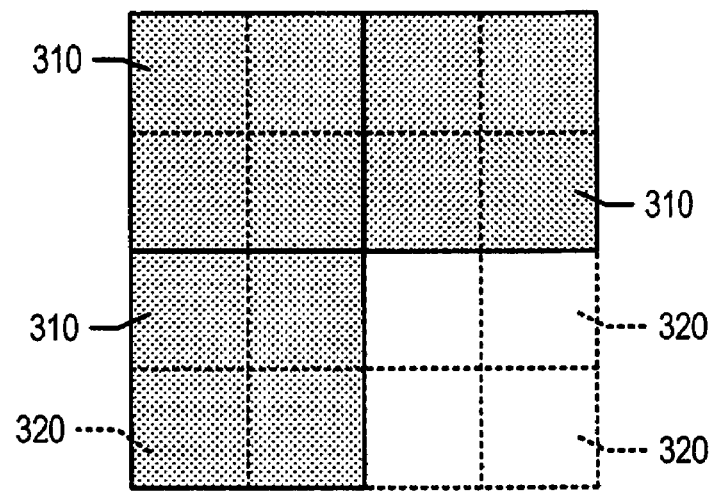

Certain embodiments of the present invention mitigate this risk by using layer resolutions having an integer ratio there between. "Integer ratio", as used herein, means that the largest pixel size is given a value of 1 and the other pixel sizes are calculated as integer multiples relative to that value. For example, FIG. 6 shows 150 ppi black pixels 320 and 100 ppi yellow pixels 310, displaying how a K:Y pixel ratio of 1.5:1 results in the edges of yellow pixels lying in the body of the active area of the black pixels. An "integer ratio" of K:Y=2:1 is shown in FIG. 7, where the inactive areas of each layer are substantially aligned, thus preventing loss of additional light and mitigating moire artifacts at pixel edges.

Figure 8:
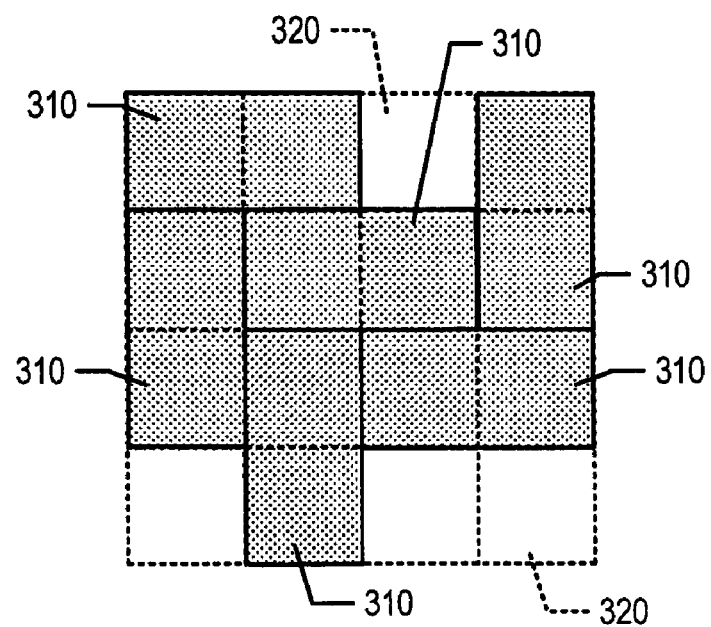

Other embodiments of the present invention use non-integer ratios. One configuration for using "non-integer" pixel ratios, but yet mitigating undesirable effects, is to use asymmetric pixels 310 arranged to align with a higher resolution layer of pixels 320. One embodiment is the "herringbone" pattern shown in FIG. 8. The pixel configuration of FIG. 8 enables a 1.4:1 K:Y ratio by using an asymmetric yellow pixel 310 with a 2:1 aspect ratio.

In practice, K:C:M:Y ratios of 4:2:2:1 (e.g. 100 ppi K, 50 ppi C and M, 25 ppi Y) may be well suited for certain images, but less suitable for text and graphics with high frequency color content. A display having such a resolution configuration may present a graphical image that appears somewhat blurred, but still acceptable for many applications. Text and graphics with significant high frequency color content may appear unacceptable for some applications. In such a case, the loss of image resolution may be driven by the reduction of cyan and magenta pixels, which provide significant luminance modulation for color text and graphics edges.

For such applications, embodiments of the present invention may only have reduced yellow layer resolution. Such a display may have a K=C=M=Y ratio of 4:4:4:1 (KCMY=100 ppi, Y=25 ppi). An image presented with such a display may have blurring significantly reduced. However, a yellow "halo" around text and graphics edges caused by the extension of yellow edges past the edges of the other colors due to the down-sampling, may be visible though.

Certain embodiments of the present invention mitigate this effect and visually preserve the high-contrast edges while still allowing for downsampling of the yellow plane. One such embodiment detects the edges in the yellow image plane and subtracts a fraction of the edges (using a weighting factor, for example) from the yellow image prior to down-sampling the yellow image. Such an approach may eliminate the yellow halo effect without changing most of the color of the image. A thin discoloration in colored text, which consists of almost all edge, may result. But, a balance may be reached between reducing the halo effect and still providing the chrominance contribution of the yellow primary. Exemplary edge detection algorithms include first-derivative gradient operators such as Canny, Sobel and Prewitt. Weighting factors logically range from 0-1, with values from 0.1-0.5 having been found to provide a reasonable balance between reducing edge "halo" and affecting perceived edge color.

It should be understood that various ratios between pixel layers, in addition to those presented herein, may be used to produce different results.

Figure 9:
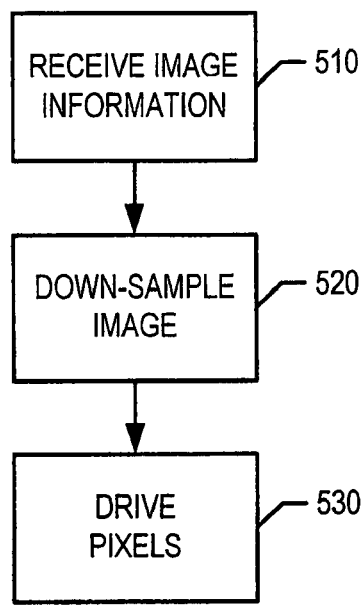
FIGS. 9-11 illustrate flow diagrams of methods according to embodiments of the present invention.

Referring now to FIG. 9, there is shown a flow diagram of a method 500 according to an embodiment of the present invention. Method 500 commences at block 510, where color image information is received. The information may be either analog or digital in form, and has been transformed and separated into digital image planes corresponding to each physical display layer. For example, an RGB image can be transformed into CMYK separations for the present embodiment. At block 520, one or more of the signal components is spatially down-sampled to the appropriate pixel size corresponding to the physical pixel size determined for the color layer, as is discussed herein. For example, one or more of the image components are spatially down-sampled relative to at least one other of the image components. By way of further example, a yellow image component resolution may be reduced relative to a black image component resolution. Similarly, magenta and/or cyan image components resolution(s) may be reduced relative to the black image component resolution. Downsampling may be done via a low-pass filtering and sub-sampling method, though other methods could be used to render the image data to each lower resolution layer. At block 530, the down-sampled image components and other image components that were not down-sampled are used to drive the independently addressable pixels of each of the stacked layers—so as to display a substantial reproduction of the image indicated by the information received at block 510.

Figure 10:
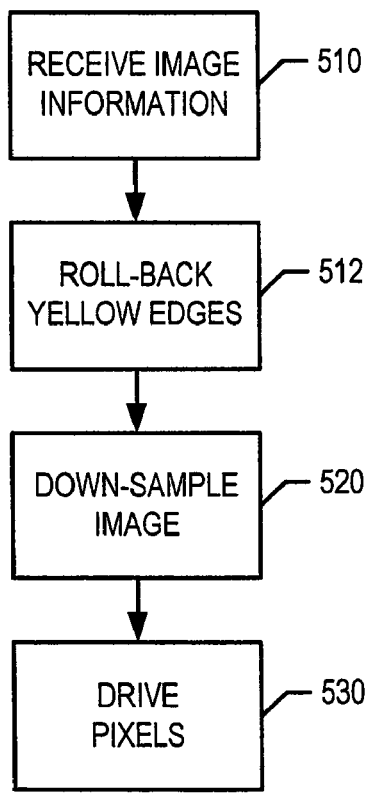

Referring now also to FIG. 10, there is shown a flow diagram of a method 502 according to an embodiment of the present invention. Method 502 includes the steps of method 500, and will not be further discussed. Method 502 additionally rolls-back yellow image component edges at block 512, in the illustrated case prior to down-sampling at block 520. Yellow edge rolling back at block 512 may be achieved by detecting at least one edge in the yellow image component, and reducing the yellow image component thereat and/or there-near, such as by using a weighting factor as previously discussed. According to embodiments of the present invention, analogous roll back of other color image components in lieu of or addition to yellow may be utilized.

Figure 11:
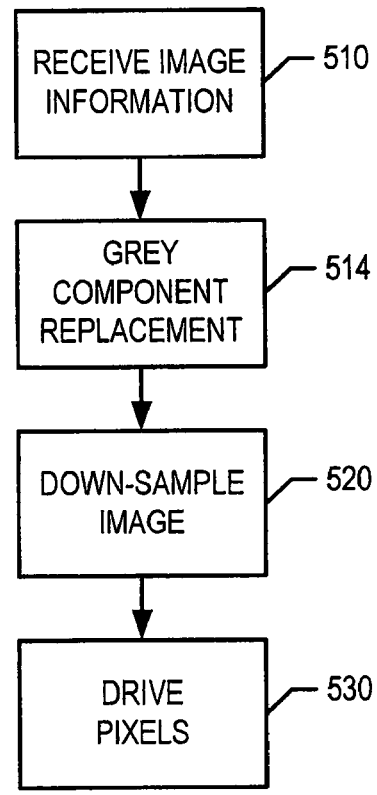

Referring now to FIG. 11, there is shown a flow diagram of a method 504 according to an embodiment of the present invention. Method 504 includes the steps of method 500, and will not be further discussed. Method 504 additionally performs grey component replacement at block 514. Grey component replacement techniques, where achromatic values that sum to grey along the tone scale are replaced with black values, are generally well-known.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A color display comprising:
   a stacked plurality of color layers, each layer being selectively reflective or absorptive of light in a different portion of the human visible spectrum;
   wherein, the layers are each configured as a plurality of independently addressable picture elements, at least some of the picture elements in at least one of the layers are superimposed in the stack over at least some picture elements in at least one of the other layers, and a resolution of the superimposed picture elements in the at least one of the layers is different from the resolution of superimposed picture elements in the at least one of the other layers.

2. The display of claim 1, further comprising a reflector, wherein the layers are selectively absorptive of light in a different portion of the human visible spectrum and are superimposed over the reflector.

3. The display of claim 1, further comprising an absorber, wherein the layers are selectively reflective of light in a different portion of the human visible spectrum and are superimposed over the absorber.

4. The color display of claim 1, wherein a ratio of the resolution of the picture elements in the at least one of the layers to the resolution of the picture elements in the other of the layers is N:1, where N is an integer.

5. The color display of claim 1, wherein the picture elements in the other of the layers are asymmetric.

6. The color display of claim 1, wherein there are four layers.

7. The color display of claim 1, wherein the plurality of layers comprises four layers, and a ratio of the resolution of the four layers is M:N:P:1, where M, N and P are integers and M>N.

8. The color display of claim 7, where M=4 and N=P=2.

9. The color display of claim 1, wherein the plurality of layers comprises four layers, and a ratio of the resolution of the four layers is M:N:P:1, where M=N=P=4.

10. The color display of claim 1, wherein the plurality of layers comprises three layers, and a ratio of the resolution of the three layers is M:N:1, where M and N are integers.

11. A method for reproducing a color image comprising:
    receiving a signal indicative of the color image having at least first and second color image components;

reducing the resolution of the first color image component relative to the resolution of the second color image component; and selectively activating picture elements dependently upon the color image components and reduced resolution color image components, wherein each picture element is in one of a plurality of superimposed color layers, and each color layer selectively reflects or absorbs light in a different portion of the human visible spectrum dependently upon the picture element activation;

wherein, the picture elements, when selectively activated, substantially display the color image.

12. The method of claim 11, wherein a ratio of the resolution of the second color image component to the resolution of the first color image component N:1, where N is an integer.

13. The method of claim 12, wherein the second color image component is a black image component.

14. The method of claim 13, where N=4.

15. The method of claim 11, further comprising replacing achromatic ones of the image components that add to grey along the tone scale with additional black image components.

16. The method of claim 11, further comprising:

detecting at least one edge in the first color image component; and reducing the first color image component near the at least one edge.

* * * * *

UNITED STATES PATENT AND TRADEMARK OFFICE
CERTIFICATE OF CORRECTION

| | | |
|---|---|---|
| PATENT NO. | : 7,567,370 B2 | Page 1 of 1 |
| APPLICATION NO. | : 11/881215 | |
| DATED | : July 28, 2009 | |
| INVENTOR(S) | : Joseph Stellbrink et al. | |

It is certified that error appears in the above-identified patent and that said Letters Patent is hereby corrected as shown below:

In column 7, line 15, in Claim 12, after "component" insert -- is --.

In column 8, line 6, in Claim 15, after "of the" insert -- color --.

Signed and Sealed this

Tenth Day of November, 2009

David J. Kappos
*Director of the United States Patent and Trademark Office*